(12) United States Patent
Tehee, Jr.

(10) Patent No.: US 7,318,154 B2
(45) Date of Patent: Jan. 8, 2008

(54) VARIOUS METHODS AND APPARATUSES TO PROVIDE REMOTE ACCESS TO A WIND TURBINE GENERATOR SYSTEM

(75) Inventor: Stanley W. Tehee, Jr., Tehachapi, CA (US)

(73) Assignee: General Electric Company, Schenectady, NY (US)

(*) Notice: Subject to any disclaimer, the term of this patent is extended or adjusted under 35 U.S.C. 154(b) by 775 days.

(21) Appl. No.: 10/674,315

(22) Filed: Sep. 29, 2003

(65) Prior Publication Data

US 2007/0266423 A1    Nov. 15, 2007

(51) Int. Cl.
*G06F 1/24* (2006.01)
(52) U.S. Cl. .................. 713/155; 713/164; 713/167
(58) Field of Classification Search ................ 713/155, 713/164, 167
See application file for complete search history.

(56) References Cited

U.S. PATENT DOCUMENTS

2002/0029097 A1    3/2002    Pionzio, Jr., et al.
2003/0006613 A1    1/2003    Lof et al.
2003/0126060 A1    7/2003    Lof et al.

FOREIGN PATENT DOCUMENTS

WO    WO 02/103879 A1    12/2002

OTHER PUBLICATIONS

Search Report, European Patent Office, Application No. EP 1 519 040 A1, Dec. 21, 2004, pp. 1-3.

*Primary Examiner*—Thomas R. Peeso
(74) *Attorney, Agent, or Firm*—Blakely, Sokoloff, Taylor & Zafman LLP

(57) ABSTRACT

Various methods and apparatus are described in which a power management controller having process control software controls output power characteristics for a group of wind turbine generators. The power management controller also has a network interface configured to allow a user of a supervisory and control network to remotely access and change output power settings of the group of wind turbine generators through a secure connection established over a network connection.

20 Claims, 3 Drawing Sheets

VARIOUS METHODS AND APPARATUSES TO PROVIDE REMOTE ACCESS TO A WIND TURBINE GENERATOR SYSTEM

FIELD OF THE INVENTION

Embodiments of the invention generally relate to a control system for one or more wind turbine generators. More particularly, an aspect of an embodiment of the invention relates to facilitating remote access to that control system for one or more wind turbine generators.

BACKGROUND OF THE INVENTION

Transmission line quality, including voltage and Volt-Ampere Reactive (VAR) fluctuations can be greatly affected by the type and function of the wind power generation system employed. Excess reactive power in electrical system's can cause excessive heating in the components causing premature failure. In addition, uncontrolled reactive power leads to voltage fluctuations that exceed the equipment specifications causing component failure. Finally, uncontrolled reactive power can lead to extreme inefficiencies with respect to power transmission, thus increasing the cost to transfer power across the grid.

Operators of transmission and distribution systems, electrical generating plants, and factories have known about this issue for quite some time. To compensate for voltage and VAR fluctuations, operators and utilities install equipment to compensate the reactive nature of their systems. Traditionally, both capacitors and reactors are used for this compensation. Capacitor banks retain or produce reactive power, measured in VARs, and reactor banks consume VARs. Depending on the VARs measured on the system, the operator would enable one of these devices. The capacitors and reactors purpose is either to minimize the total amount of VARs flowing or to achieve a desired running voltage. Currently, the manufactures of these devices provide them with microprocessor based controllers so that they can be automatically cycled.

Usually, wind plants are located at the end of radial feeder. Usually, without some form of voltage control, the voltage at the wind farm could go out of operating specifications. This issue is generally handled by load flow studies performed before construction begins so as to assess the performance of the transmission system. To compensate for excessive voltage swings utilities install equipment on their electrical networks to control the amount of VARs that flow, usually in the form of capacitors or reactor banks.

A controller may be installed that runs a program that monitors the changing grid conditions, and either connects or disconnects the capacitor/reactor bank to or from the grid. The controller collects data from sensors sensing the various grid conditions. The controller compares the sensor readings to the pre-programmed commands, and responds to them. However, the current design of these devices does not allow them to quickly respond to changing grid conditions. In addition, these devices are not adjustable. For example, capacitor banks need to discharge when disconnected from the transmission system and cannot reconnect for five minutes. Furthermore, capacitor and reactor banks change the VAR flow by a set amount, which can result in over or under compensation. Some manufactures have tried to resolve this problem by making fast adjustable reactive power devices. However, utility companies may be reluctant to install such devices due to their great expense.

In many wind turbine sites, the utility company finds it necessary to curtail or slow production because of grid problems inherent with the grid or the wind farm.

In some cases, if the utility company wants to change the setting in a wind park control unit, the utility company has to call the wind farm site Operations and Maintenance (O&M) personnel and have them drive to the substation to facilitate the change. Depending on the lay out of the wind farm site, this can take up to an hour or more to reach the appropriate substation.

SUMMARY OF THE INVENTION

Various methods and apparatus are described in which a power management controller having process control software controls output power characteristics for a group of wind turbine generators. The power management controller also has a network interface to allow a user of a supervisory and control network to remotely access and change output power settings of the group of wind turbine generators through a secure network connection.

BRIEF DESCRIPTION OF THE DRAWINGS

The drawings refer to embodiments of the invention in which.

Figure 1:
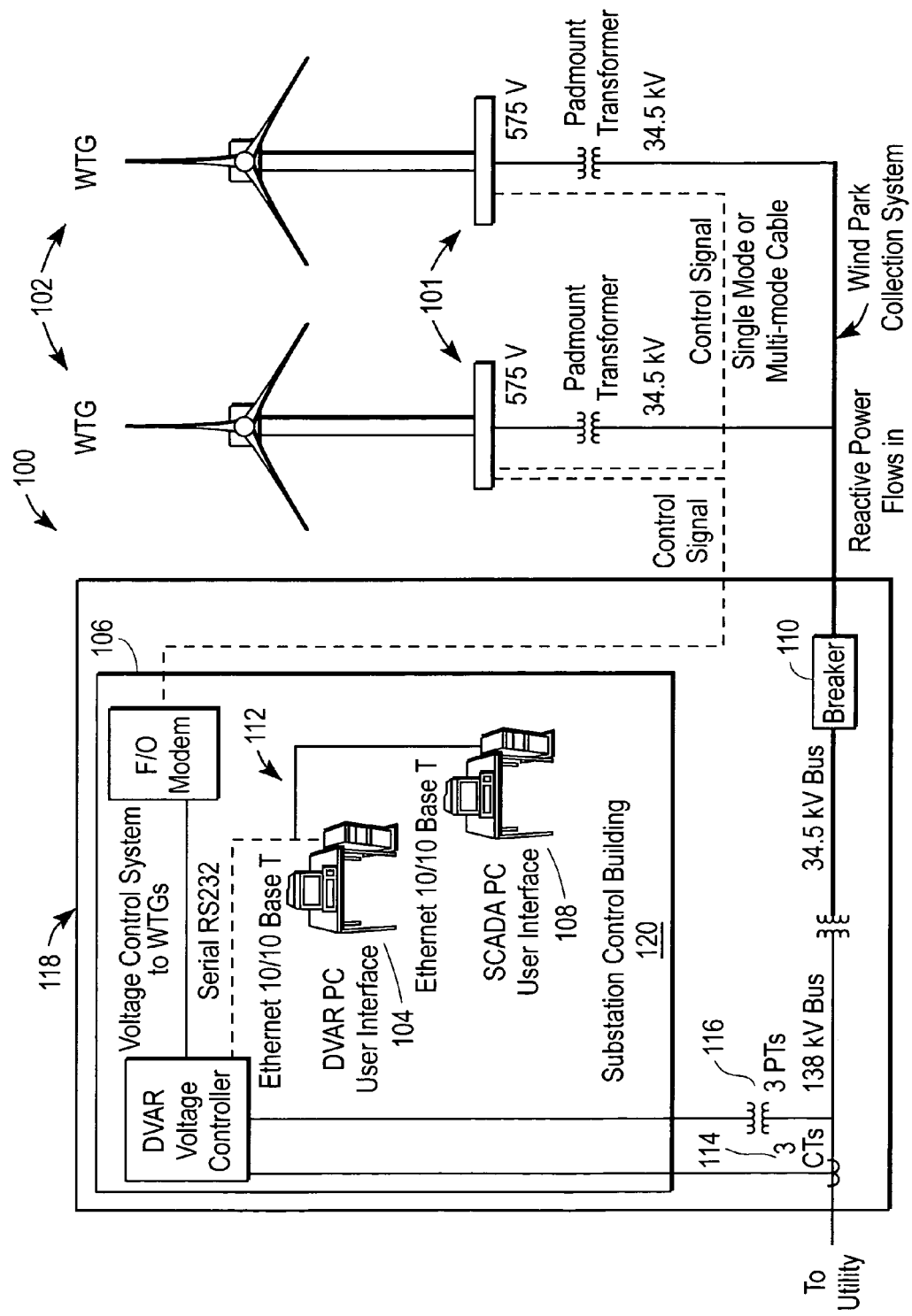
FIG. 1 illustrates a block diagram of wind farm having a power management controller with a network interface that allows a user at a remote location to change a setting effecting output power characteristics of the group of wind turbine generators in the wind farm.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of servers, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as to a first location, may be made. However, the specific numeric reference should not be interpreted as a literal sequential order but rather interpreted that the first location is different than a second location. Thus, the specific details set forth are merely exemplary. The specific details may be varied from and still be contemplated to be within the spirit and scope of the present invention.

In general, the various methods and apparatus are described in which a power management controller having process control software, such as programmable logic controller for a dynamic Volt-Ampere Reactive (DVAR) system, controls output power characteristics, such as wind park voltage, reactive power, power factor, or other similar power characteristics, for a group of wind turbine generators. The power management controller also has a network interface configured to allow a user of a supervisory and control network, such as part of a Supervisory Control and Data Acquisition (SCADA) system, to remotely access and change output power settings of the group of wind turbine generators through a secure network connection, such as a high bandwidth a category 5 (cat5) cable.

FIG. 1 illustrates a block diagram of wind farm having a power management controller with a network interface that allows a user at a remote location to change a setting effecting output power characteristics of the group of wind turbine generators in the wind farm. A Dynamic VAR Control system 100 may include a solid state power converter 101 on each wind turbine generator 102, substation metering such as current transformers 114, potential transformers 116, transducers, etc., a power management controller 104 having process control software and/or hardware and a network user interface, a distributed wind park communications system 106 including a modem 118, and a supervisory and control network 108. The power management controller 104 may be a programmable logic controller and personal computer working tandem.

The output power generated from the wind turbine generators 102 couples to the utility power grid. Each group of wind turbine generators 102 generally connects to a single point of interconnect 110. The group of wind turbine generators 102 deliver power to the utility power grid through the single point of interconnect 110.

The power management controller 104 monitors and controls the electrical characteristics at the point of interconnect 110 via substation metering 114, 118 and the distributed communications system 106. The power management controller 104 monitors electrical characteristics such as, voltage, power, reactive power, etc. The power management controller 104 also communicates to each of wind turbine generators 102 in the group via a distributed communications system.

The power management controller 104 has process control software and/or hardware to control output power characteristics, such as wind park voltage, reactive power, power factor, or other similar power characteristics, for the group of wind turbine generators 102. The power management controller 104 also has a network interface configured to allow a user of a supervisory and control network 108 to remotely access and change output power settings of the group of wind turbine generators 102 through a secure connection established over a network connection 112 that has a bandwidth to support digital transmissions at least at a rate of one gigabyte per second, such as category 5 cable.

In one embodiment, the supervisory and control network 108 has a resident secure connection software, such as Terminal Services™ by Microsoft, web-based secure protocols, or other similar secure software, to allow secure customer remote access to the supervisory and control network 108.

The distributed communications system 106 relays messages and signals from the power management controller 104 to the wind turbine generators 102. For example, the power management controller 104 sends a message indicating the required ratio of reactive (VARs) and real power (Watts) for each wind turbine generator 102 to produce. The distributed communications system 106 may consist of fiber optic lines and modems connected between the substation and each wind turbine generator 102. The distributed communications system 106 transmits the messages and signals from the power management controller 104 with negligible delay, typically less than 120 milliseconds.

In one embodiment, located in each wind turbine generator 102 is an induction generator that couples to a power electronics package 101. The solid state power converter 101 adjusts the VAR output of the induction generator.

The wind turbine generator 102 either produces or consumes VARs depending on the signal sent to the solid state power converter 101 from the power management controller 104. The VARs that each wind turbine generator 102 produces or consumes flows through the point of interconnect 110 via the wind park collection system (not shown). A monitoring device at the point of interconnect 110 detects the sum of watts and VARs that the group of wind turbine generator 102 within the park are producing or consuming. The power management controller 104 controls parameters at the point of interconnect 110, such as wind park voltage, reactive power, power factor, or other similar power characteristics. Each of these parameters is controllable and established by a set point value in or accessible by the power management controller 104.

In one embodiment, the power management controller 104 executes software that presents a network user interface that allows the plant operators to control these parameters, either at the substation 120 or at the operations and maintenance (O & M) building. In one embodiment, the power management controller 104 has resident secure connection software to allow secure customer remote access, via the supervisory and control network 108 and network connection 112, to a web page corresponding to the IP address of the power management controller 104. The network user interface may be presented via the secure services software and a JAVA™ based web browser integrated into the companies IP network.

The power management controller 104 features give park owners and the utilities the capability to easily integrate collection system and transmission system operations. The network interface may be web-based and accessed through Microsoft Internet Explorer. By employing web-based technology, park operators and remote utility operators can use multiple operating systems such as Windows™, Linux™, and Macintosh™, and so on to control grid parameters in near real time. This gives site operators and remote utility operators the ability to quickly adjust to local grid conditions. The software/hardware resident in the power management controller 104 can easily integrate with other platforms and operating systems that use the JAVA™ run time environment. The wind park site operators and remote utility operators can manipulate grid conditions by sitting at their desk and using their own PC to change the appropriate set point.

Figure 2:
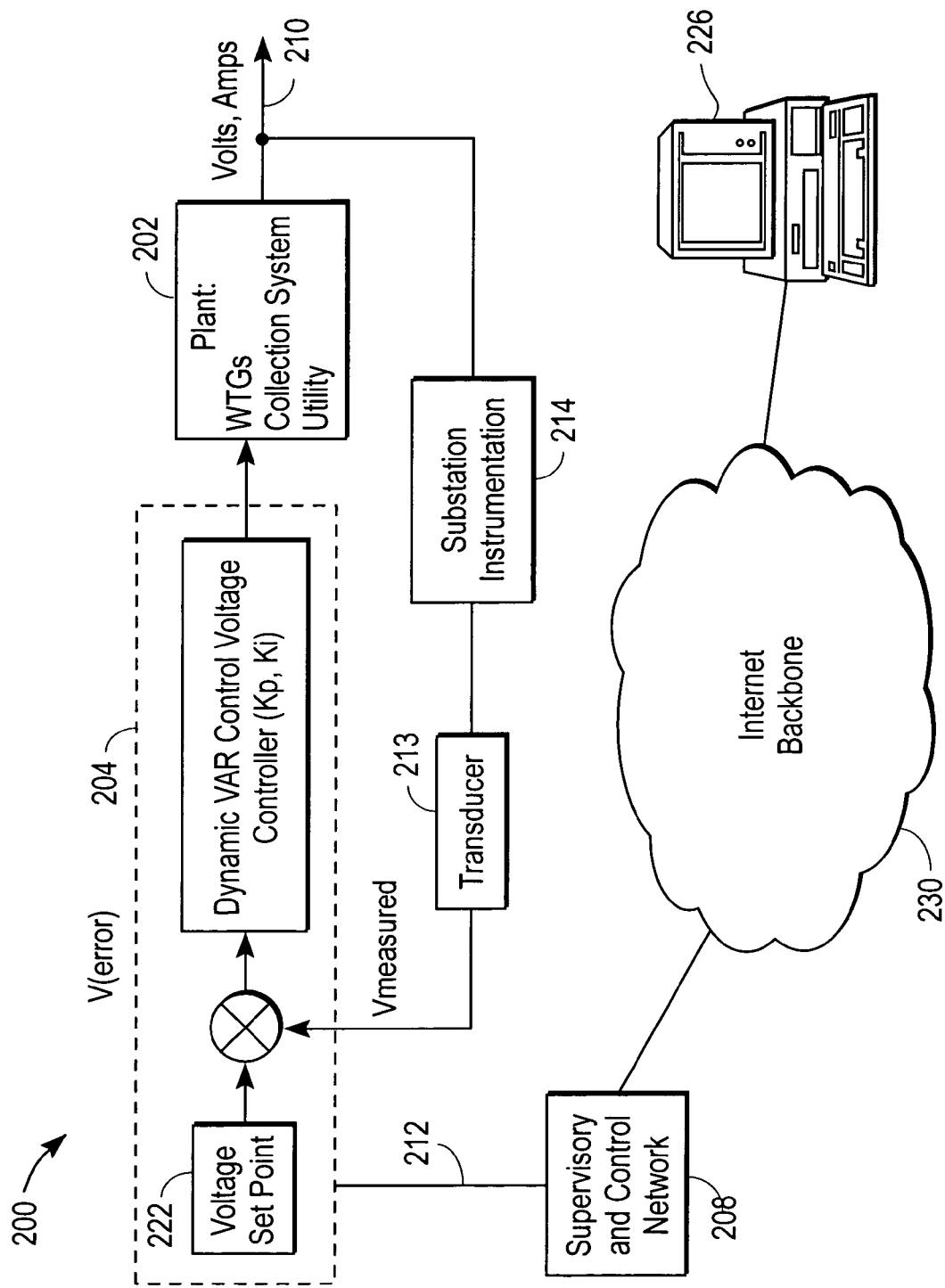
FIG. 2 illustrates a closed loop diagram for an embodiment of the dynamic VAR control system.

FIG. 2 illustrates a closed loop diagram for an embodiment of a dynamic VAR control system. The dynamic VAR Control system 200 uses a high-speed digital transducer to gather parameter data such as voltage, current, watts, VARs, power-factor, and frequency, at the point of interconnect 210. Instrumentation 214 connects between the utility power grid and the transducer 213. The instrumentation 214 measures the utility power grid parameters and sends the information to the transducer 213. The transducer 213 then converts the measurements into a digital value and sends it to the power management controller 204. In one embodiment, the power management controller 204 uses process control software that receives a set point value 222 provided by the user 226 via the user interface. The power management controller 104 then analyzes the data received from the transducer 213 and then uses the set point value 222 to compute a ratio of reactive and real power for the wind turbine generators 202 to produce.

The network interface of the power management controller 204 also displays to the user 226 indications of the output power characteristics of the group of wind turbine generators 202. In one embodiment, the network interface of the power management controller 204 also presents to the user at least three controllable parameters. The adjustable set point parameters 222 include voltage, VARs, and power factor. Each control parameter is an average measurement of the three phases.

The voltage set point may limit the output voltage sensed on the interconnect 210 to plus or minus 10 percent of the nominal phase-to-phase value on the transmission system. For example, if the nominal voltage is 34.5 kV, then the voltage set point range is 31.050 kV to 37.95 kV.

The reactive power set point may control voltage relative to the amount of reactive power available and the system impedance. System impedance may be the ratio of driving force (volts) to the system response, i.e. "load" or "amps." The magnitude of VARs a plant can produce is dependent on the commanded power factor, the number of wind turbine generators 202 operating in the wind plant and the current production level of each wind turbine generators 202.

The power factor set point may be set between a range of −0.90 to 0.95. The commanded power factor is controlled at the point of interconnect 210. The consumption of reactive power by a collection system may be different for each wind park.

As the wind changes, so does the volts, watts, and VARs produced by the wind turbine generators 202 within the collection system and grid. The power management controller 204 manages voltages, VARs, and coordinates them with the power produced.

A remote user 226 may access the network interface and change the set point values 222. In one embodiment, to access the network interface, the supervisory and control network 208 receives a log on ID and a password from a user 226 at a location remote to the wind park, such as Load Dispatcher from a utility company. In one embodiment, the supervisory and control network 208 establishes a secure connection with secure services software resident in the supervisory and control network 208 with the user 226 at the remote location over the Internet 230 (or other networked environment).

The secure connection software in the supervisory and control network 208 establishes a second secure connection from the supervisory and control network 208 over a local area network 212 to the network interface. The network interface may be presented as a web page associated with the group of wind turbine generators.

The secure connection software is also resident in the power management controller 104. Secure connection software such as Terminal Services extends the model of distributed computing by allowing personal computers to operate in a server-based computing environment. With Terminal Services running on a Windows-based server, all client application execution, data processing, and data storage occur on the server. Applications and user desktops are transmitted over the network and displayed via terminal emulation software. The secure connection software may also present the network interface to multiple locations allowing remote users with the proper access level to change a setting effecting output power characteristics of the group of wind turbine generators.

Note the secure connection software may also be implemented with a web-based Secure Sockets Layer (SSL) protocol, Secure HTTP (S-HTTP) protocol, or other software that creates a secure connection between a client and a server.

The network interface provides different levels of access to view and change parameters of the group of wind turbine generators based on user indicia, such as, for example, user identification and password. The network interface also allows remote users the ability to monitor and change parameters of the wind park containing the group of wind turbine generators other than the output power characteristics of the group of wind turbine generators, such as frequency, based on user indicia. The network interface also allows remote users the ability to monitor and change parameters of the supervisory and control network 108 based on user indicia.

The power management controller 204 may change output power settings of the group of wind turbine generators 202 in less than ten seconds from the time the user 226 requests the change from the supervisory and control network 208.

The power management controller 204 to provide may the supervisory and control network 208 indications of the output power characteristics of the group of wind turbine generators 202 in less than ten seconds from the time the characteristic is generated at the group of wind turbine generators 202.

Figure 3:
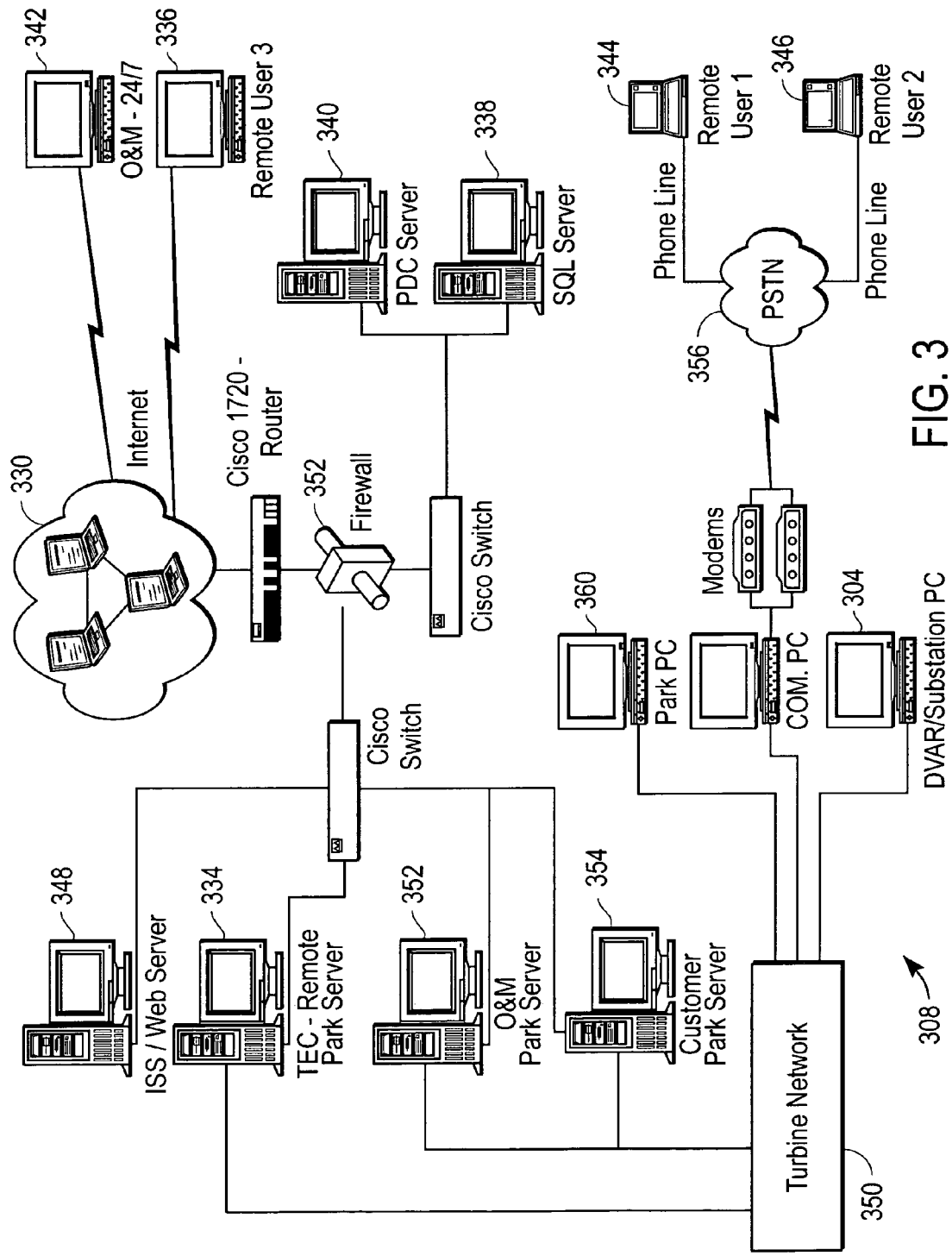
FIG. 3 illustrates a block diagram of an embodiment of communications architecture to access and establish a set point for the group of wind turbine generators.

FIG. 3 illustrates a block diagram of an embodiment of communications architecture to access and establish a set point for the group of wind turbine generators. The supervisory and control network 308 may include several servers such as a terminal emulation services server 334, a primary domain controller server 340, and a Structured Query Language (SQL) server 338. The terminal emulation services server 334 may be located in the substation. The terminal emulation services server 334 may provide terminal emulation services to terminals 336, 342, 344, 346 with access to the supervisory and control network 308. The primary domain controller server 340 provides security for its local domain by referencing a database of usernames, passwords and permissions. The primary domain controller server 340 cross-references a user 336, 342, 344, 346 accessing the network interface with the information in the database. The SQL server 338 may be a relational Database for DOS, OS/2, NetWare, and NT applications storing the usernames, passwords and permissions. A web server 348 communicates an IP address for the network interface to the network components connected to the local network 350 and provide web services. A firewall 352 gives users 342, 336 secure access to and from the Internet 330 as well as to separate the Internet 330 from the internal turbine network 350. The firewall 352 may also provide network address translation to allow one IP address, which is shown to the outside world, to refer to many IP addresses for network components on the internal network 350. On the internal network 350 usually one IP address exist for each client station 352, 354, 304.

The power management controller 304 may have terminal services software resident in the programmable logic controller. A remote user with the proper access levels, such as a third remote user 336, may access the network interface provided by the terminal service over the Internet 330 via the supervisory and control network 308. A remote user with the proper access levels, such as first remote user 344, may also access the network interface provided by the terminal service over one or more lines of the Plain Old Telephone System 356.

The remote utility user may now access, monitor, and control output power characteristics of the group of wind turbine generators in a wind park. By allowing remote accesses to the site, the O&M personnel and remote utility user can effect changes at near real time. Also, the remote monitoring allows near real time viewing of what the wind park is producing.

The utility company can change the wind farm electrical characteristics in near real time via the TCP/IP connection to the power management controller. This allows the utility company to change the power grid in a positive manner. Also, this can help the wind park site owner because the utility company might decide to curtail other wind farm sites that do not have the power management controller system, rather than sites having a power management controller that can be utilized to maintain grid stability. This can then translate into the wind turbine generators running longer and producing more for the wind park site owner. Also, the network interface can be accessed throughout the wind park at virtually any computer terminal 304, 334, 348, 352, 354 on the internal network 350.

The resident secure services software in the supervisory and control network 308 may also used to provide terminal emulation services to allow secure remote customer access to controls and monitored data in the Supervisory and Control system.

The secure connection software for both the supervisory and control network 308 and the power management controller 304 limits access on the web page presenting the network interface to logged on users, remote and non remote, with the proper access levels. The utility is now able to directly control the wind park control system and use the wind farms to strengthen the grid in the area of the wind park.

In an embodiment, a DVAR PLC is set to match a GE Supervisory and Control And Data Acquisition System I.P. Scheme. The DVAR PLC is available from GE Wind Energy LLC in Tehachapi, Calif. The GE Supervisory and Control And Data Acquisition System is available from GE Wind Energy LLC in Tehachapi, Calif. The programmable logic controller that is part of the power management controller 104 for the Dynamic Volt-Ampere Reactive (DVAR) system may be Modicon Programmable Logic Controller that contains process control software.

While some specific embodiments of the invention have been shown the invention is not to be limited to these embodiments. The invention is to be understood as not limited by the specific embodiments described herein, but only by scope of the appended claims.

I claim:

1. A method, comprising:
   establishing a first secure connection between a supervisory and control network and a first location via a networked environment;
   establishing a second secure connection between the supervisory and control network and a network interface associated with a group of wind turbine generators using a local area network; and
   changing a setting from the first location to cause a change in output power characteristics of one or more wind turbine generators in the group of wind turbine generators using the network interface, wherein the first location is remote to the group of wind turbine generators.

2. The method of claim 1, further comprising:
   providing terminal services that present the network interface to multiple locations including the first location, which allows the user to change a setting effecting operations of the group of wind turbine generators.

3. The method of claim 1 wherein the network interface is used to control VARs of the group of wind turbine generators.

4. The method of claim 1, further comprising:
   viewing and changing parameters of the group of wind turbine generators based on user indicia using one or more of a plurality of levels of access to access the network interface.

5. The method of claim 1, further comprising:
   changing parameters of a wind park containing the group of wind turbine generators other than the output power characteristics of the group of wind turbine generators from the first location via the network interface.

6. The method of claim 1 further comprising:
   using a secure connection software to establish the first secure connection.

7. An apparatus, comprising:
   a power management controller having process control software to control output power characteristics for a group of wind turbine generators; and
   a network interface, responsive to the power management controller, to allow a user of a supervisory and control network to remotely access and change output power settings of the group of wind turbine generators through a secure network connection.

8. The apparatus of claim 7, further comprising:
   a server located with the group of wind turbines to provide terminal emulation services to one or more terminals with access to the supervisory and control network.

9. The apparatus of claim 8, wherein the network interface is provided by a terminal emulation service.

10. The apparatus of claim 7, further comprising:
    a server to provide security for a local domain by referencing a database of access information, wherein the server cross-references a user accessing the network interface with the access information in the database to determine whether to allow the user access to the supervisory and control network.

11. The apparatus of claim 7, wherein the network connection is through a cable connecting the supervisory and control network to the power management controller, wherein the cable has a bandwidth to support digital transmission at least at a rate of one gigabytes per second.

12. The apparatus of claim 7, further comprising:
    a web server located with the group of wind turbines to communicate an IP address for the network interface and provide Web services.

13. The apparatus of claim 7, wherein the supervisory and control network has resident secure connection software to allow secure remote access to the supervisory and control network for an individual.

14. The apparatus of claim 7, wherein the power management controller has resident secure connection software to allow secure individual remote access to a web page associated with the power management controller.

15. The apparatus of claim 7 wherein the power management controller is a programmable logic controller for a dynamic Volt-Ampere Reactive system.

16. The apparatus of claim 7, wherein the network interface is remotely accessible over a Plain Old Telephone System (POTS) line.

17. An apparatus, comprising:
    means for establishing a first secure connection between a supervisory and control network and a first location via a networked environment;

means for establishing a second secure connection between the supervisory and control network and a network interface associated with a group of wind turbine generators using a local area network; and changing a setting from the first location to cause a change in output power characteristics of one or more wind turbine generators in the group of wind turbine generators using the network interface, wherein the first location is remote to the group of wind turbine generators.

18. The apparatus of claim 17, further comprising:

means for providing terminal services that present the network interface to multiple locations including the first location, which allows the user to change a setting effecting operations of the group of wind turbine generators.

19. The apparatus of claim 17, further comprising:

viewing and changing parameters of the group of wind turbine generators based on user indicia using one or more of a plurality of levels of access, such as user identification and password, accessing the network interface.

20. The apparatus of claim 17, further comprising:

means for changing parameters of a wind park containing the group of wind turbine generators other than the output power characteristics of the group of wind turbine generators from the first location via the network interface.

* * * * *